(12) United States Patent
Kwon et al.

(10) Patent No.: US 10,815,545 B2
(45) Date of Patent: Oct. 27, 2020

(54) GRAIN-ORIENTED ELECTRICAL STEEL PLATE AND MANUFACTURING METHOD THEREOF

(71) Applicant: POSCO, Pohang-si, Gyeongsangbuk-do (KR)

(72) Inventors: Oh-Yeoul Kwon, Pohang-si (KR);
Won-Gul Lee, Pohang-si (KR);
Seong-Cheol Hong, Pohang-si (KR);
Gyoo-Taek Lee, Pohang-si (KR);
Jong-Tae Park, Pohang-si (KR);
Choong Soo Lim, Pohang-si (KR)

(73) Assignee: POSCO, Pohang-si, Gyeongsangbuk-do (KR)

( * ) Notice: Subject to any disclaimer, the term of this patent is extended or adjusted under 35 U.S.C. 154(b) by 209 days.

(21) Appl. No.: 15/539,960

(22) PCT Filed: Dec. 21, 2015

(86) PCT No.: PCT/KR2015/014036
§ 371 (c)(1),
(2) Date: Jun. 26, 2017

(87) PCT Pub. No.: WO2016/105055
PCT Pub. Date: Jun. 30, 2016

(65) Prior Publication Data
US 2017/0369960 A1    Dec. 28, 2017

(30) Foreign Application Priority Data
Dec. 11, 2015  (KR) .................. 10-2015-0177394

(51) Int. Cl.
B23K 26/364    (2014.01)
C21D 8/12      (2006.01)
(Continued)

(52) U.S. Cl.
CPC ........ *C21D 8/1283* (2013.01); *B23K 26/0622* (2015.10); *B23K 26/08* (2013.01);
(Continued)

(58) Field of Classification Search
CPC .......... C21D 9/46; C21D 8/12; C21D 8/1222; C21D 8/1233; C21D 8/1277;
(Continued)

(56) References Cited

U.S. PATENT DOCUMENTS 4,964,922 A * 10/1990 Ames .................. C21D 8/1294
                                                          148/111
5,718,775 A *  2/1998 Komatsubara ........... C21D 3/02
                                                          148/308

FOREIGN PATENT DOCUMENTS

CN    1188811 A    7/1998
CN    1236824 A   12/1999
(Continued)

OTHER PUBLICATIONS

Extended European Search Report dated Nov. 27, 2017 issued in European Patent Application No. 15873582.9.
(Continued)

*Primary Examiner* — Megha M Gaitonde
(74) *Attorney, Agent, or Firm* — Morgan, Lewis & Bockius LLP (57) ABSTRACT

A grain-oriented electrical steel plate of an exemplary embodiment of the present invention has a groove formed on a surface, wherein a curvature radius RBb at a position where a depth of the groove is maximum is 0.2 μm to 100 μm, and a curvature radius RSb on the groove surface from the position where the depth of the groove is maximum to a quarter-way position of the depth D of the groove is 4 μm to 130 μm.

19 Claims, 3 Drawing Sheets

(51) Int. Cl.
  *C23C 8/26* (2006.01)
  *C22C 38/02* (2006.01)
  *C23C 8/02* (2006.01)
  *B23K 26/0622* (2014.01)
  *C23C 8/80* (2006.01)
  *B23K 26/08* (2014.01)
  *C22C 38/00* (2006.01)
  *C22C 38/06* (2006.01)
  *C22C 38/04* (2006.01)
  *C21D 9/46* (2006.01)
  *C23C 8/18* (2006.01)
  *B23K 103/04* (2006.01)
  *B23K 101/36* (2006.01)
  *B23K 101/18* (2006.01)
  *B23K 101/34* (2006.01)
  *B23K 101/16* (2006.01)

(52) U.S. Cl.
  CPC .......... *B23K 26/364* (2015.10); *C21D 8/1294* (2013.01); *C21D 9/46* (2013.01); *C22C 38/001* (2013.01); *C22C 38/002* (2013.01); *C22C 38/02* (2013.01); *C22C 38/04* (2013.01); *C22C 38/06* (2013.01); *C23C 8/02* (2013.01); *C23C 8/18* (2013.01); *C23C 8/26* (2013.01); *C23C 8/80* (2013.01); *B23K 2101/16* (2018.08); *B23K 2101/18* (2018.08); *B23K 2101/34* (2018.08); *B23K 2101/36* (2018.08); *B23K 2103/04* (2018.08); *C21D 8/1255* (2013.01); *C21D 8/1272* (2013.01); *C21D 2201/05* (2013.01)

(58) Field of Classification Search
  CPC .......................... C21D 8/1283; C21D 8/1288; C21D 2201/05; B32B 15/013; B32B 15/04; B32B 15/043; B32B 15/18; B32B 3/26; B32B 3/263; B32B 3/30; H01F 1/18; Y10T 428/24174; Y10T 428/24479; Y10T 428/24521; Y10T 428/24537; Y10T 428/24545; Y10T 428/2457; Y10T 428/24612; Y10T 428/2462; Y10T 428/24942; Y10T 428/2495
  USPC ....... 428/119, 156, 161, 163, 164, 167, 172, 428/173, 212, 213
  See application file for complete search history.

(56) References Cited

FOREIGN PATENT DOCUMENTS

| | | | |
|---|---|---|---|
| CN | 1253658 | A | 5/2000 |
| CN | 1256321 | A | 6/2000 |
| CN | 1556869 | A | 12/2004 |
| CN | 101979676 | A | 2/2011 |
| CN | 102471850 | A | 5/2012 |
| CN | 102639726 | A | 8/2012 |
| CN | 102941413 | A | 2/2013 |
| CN | 103069038 | A | 4/2013 |
| CN | 104203486 | A | 12/2014 |
| EP | 0870843 | A1 | 10/1998 |
| JP | S60-103183 | A | 6/1985 |
| JP | H06-22179 | B2 | 3/1994 |
| JP | H06-57333 | A | 3/1994 |
| JP | H06-57335 | A | 3/1994 |
| JP | H06-158166 | A | 6/1994 |
| JP | H07-220913 | A | 8/1995 |
| JP | 2004-56090 | A | 2/2004 |
| JP | 2007-002334 | A | 1/2007 |
| JP | 2012-087332 | A | 5/2012 |
| JP | 2012-172215 | A | 9/2012 |
| JP | 2012-177164 | A | 9/2012 |
| JP | 2014-194073 | A | 10/2014 |
| KR | 10-2008-0010454 | A | 1/2008 |
| KR | 10-2013-0020933 | A | 3/2013 |
| KR | 10-2013-0128214 | A | 11/2013 |
| KR | 10-2014-0133974 | A | 11/2014 |
| WO | 2004-083465 | A1 | 9/2004 |
| WO | 2011-125672 | A1 | 10/2011 |
| WO | 2012-014290 | A1 | 2/2012 |
| WO | 2012/068868 | A1 | 5/2012 |
| WO | 2012-165393 | A1 | 12/2012 |

OTHER PUBLICATIONS

Edited by Fengxi Lu, Hao Wang and Guoquan Liu, "Production Technology of Foreign Cold-Rolled Silicon Steel", Machinery Industry Press, Archival Library of Chinese Publication CIP data No. 041295, Mar. 31, 2013, pp. 185-189, Beijing, China.

Written Opinion and International Search Report dated May 4, 2016 issued in International Patent Application No. PCT/KR2015/014036 (with partial English translation).

\* cited by examiner

Rolling direction

GRAIN-ORIENTED ELECTRICAL STEEL PLATE AND MANUFACTURING METHOD THEREOF

CROSS REFERENCE

This patent application is the U.S. National Phase under 35 U.S.C. § 371 of International Application No. PCT/KR2015/014036, filed on Dec. 21, 2015, which claims the benefit of Korean Patent Application No. 10-2014-0189060, filed on Dec. 24, 2014 and Korean Patent Application No. 10-2015-0177394, filed on Dec. 11, 2015, the entire contents of each are hereby incorporated by reference.

BACKGROUND OF THE INVENTION

(a) Field of the Invention

The present disclosure relates to a grain-oriented electrical steel plate and a manufacturing method thereof.

(b) Description of the Related Art

A grain-oriented electrical steel plate is used as an iron core material of an electrical device such as a transformer, and in order to reduce a power loss of the electrical device and to improve efficiency thereof, it is necessary to provide a steel plate having a magnetic characteristic of less iron loss and a high magnetic flux density.

In general, the grain-oriented electrical steel plate refers to a material having texture (referred to as a "GOSS texture") oriented in a rolling direction through a hot rolling process, a cold rolling process, and an annealing process.

When a degree of orientation in a direction in which iron is easily magnetized is high, the grain-oriented electrical steel plate exhibits an excellent magnetic characteristic.

A process of manufacturing the grain-oriented electrical steel plate firstly manufactures a steel material having a composition required of an electrical steel plate into a slab, and hot rolling is performed after heating the slab to manufacture a hot rolled steel plate. Next, hot rolled plate annealing is selectively performed for the hot rolled steel plate as necessary, and one cold rolling step or several cold rolling steps as necessary are performed to manufacture a cold-rolled steel plate having a required thickness. Decarburization annealing and an optional nitriding treatment are performed for the manufactured cold-rolled steel plate, and high temperature annealing (referred to as final annealing or secondary recrystallization annealing) is performed in a state where an annealing separator is applied.

In this way, the high-temperature annealing is performed, and then planarization annealing is selectively performed to correct a shape of the steel plate. Also, to provide a tension to the steel plate before or after the planarization annealing, tension coating is performed if necessary. This tension coating is also referred to as insulating coating as a thin insulating film is formed on a surface of the steel plate when a coating liquid of a mineral or an organic-inorganic composite coating liquid is coated on the surface of the steel plate and a baking treatment is performed.

On the other hand, magnetic domain miniaturizing that reduces a width of a magnetic domain is performed in order to improve a magnetic characteristic of the grain-oriented electrical steel plate.

The magnetic domain miniaturizing method forms a linear groove on the surface of the electrical steel plate as a physical means. There is an etching method or a roll method as the physical means of forming the groove, however a method of irradiating a laser is preferred.

This magnetic domain miniaturizing method may be divided into temporal magnetic domain miniaturizing and permanent magnetic domain miniaturizing depending on a magnetic domain miniaturizing improvement effect after stress removal annealing.

The permanent magnetic domain miniaturizing method of forming the groove by the laser irradiation may be performed in an intermediate step or a later step of the process of manufacturing the electrical steel plate. That is, the groove may be formed after performing the final cold rolling, before or after the decarburization annealing, before or after the high temperature annealing, or before or after the planarization annealing.

The permanent magnetic domain miniaturizing method by the laser uses a method of irradiating a high power laser to the surface part of the electrical steel plate and forming a groove accompanying fusion of a supporting part by the laser irradiation. In this case, as the laser used, there are a Q-Switch or a pulse laser and a continuous wave laser.

As described above, in the case of performing the permanent magnetic domain miniaturizing by using the laser, when irradiating the laser beam on the electrical steel plate, the groove is formed while accompanying the fusion in the surface of the steel plate by the laser beam.

Accordingly, because the permanent magnetic domain miniaturizing method using the laser forms a deep groove accompanying the fusion, it is required to minimize laser energy density when forming the groove. That is, when the laser energy density required for forming the groove is minimized, the linear groove may be formed at a high speed by the lower laser output.

Also, in the case that a fusion alloy layer partially or entirely remains inside the groove when forming the groove, because a heat effect is large near the groove, there is a drawback that magnetic density deterioration largely appears on the part where the laser is irradiated in the steel plate surface.

DISCLOSURE

Technical Problem

An exemplary embodiment of the present invention provides a grain-oriented electrical steel plate formed with a linear groove with a comparatively low energy density and having an excellent iron loss improvement characteristic even after the laser irradiation.

Technical Solution

Another exemplary embodiment of the present invention provides a manufacturing method of a grain-oriented electrical steel plate forming the groove with the comparatively low energy density, having the iron loss improvement characteristic even after the laser irradiation, and forming the linear groove by irradiating the laser at a high speed.

For a grain-oriented electrical steel plate according to an exemplary embodiment of the present invention, the grain-oriented electrical steel plate includes a groove formed on a surface thereof, wherein the groove is formed in a state that a non-metal oxide layer is coated on the surface of the electrical steel plate, and the groove is formed with a narrow width and a deep depth as a ratio of the width Wb and the depth Db is 3.4:1 to 1.5:1.

The groove is formed with the narrow width and the deep depth with a ratio of the width Wb and the depth Db being 3.2:1 to 2:1.

An inflection point Xb of a tangential portion interconnecting vertical tangential portions of a curvature radius RBb of a position where a depth of the groove bottom is a maximum and a curvature radius RSb on the groove surface from a position where the groove depth is a maximum to a quarter-way position of the groove depth Db may be formed below a halfway position (½ Da) of the groove depth.

The groove may have the curvature radius RBb of 0.2 μm to 100 μm at a position where the depth of the groove is a maximum.

The non-metal oxide layer may be formed of any one among $Mg_2SiO_4$, $MgAl_2O_4$, $MnO$, $MnO_2$, and $Mn_2SiO_4$ or a combination of more than one thereof.

The non-metal oxide layer may be formed with a 1-20 μm thickness on the surface of the electrical steel plate. The non-metal oxide layer may be formed with a 1-5 μm thickness on the surface of the electrical steel plate.

A curvature radius $R_s$ on the groove surface from the position where the groove depth is a maximum to a quarter-way position of the depth D of the groove may be 4 μm to 130 μm.

Recrystallization of a coated steel plate may exist under the groove.

A depth Db of the groove may be 3% to 8% of the thickness of the electrical steel plate.

An upper width Wb of the groove may be 10 μm to 50 μm.

The groove may be formed to be linear, and the linear groove may form an angle of 82° to 98° (excluding for 90°) with respect to a rolling direction of the electrical steel plate.

A manufacturing method of a grain-oriented electrical steel plate according to an exemplary embodiment of the present invention includes: a step of coating an annealing separator on a cold-rolled electrical steel plate after decarburization annealing and forming secondary recrystallization through high temperature annealing to form a non-metal oxide layer on a surface of the electrical steel plate; and a step of forming a groove on a surface of the electrical steel plate formed with the non-metal oxide layer, wherein the groove is formed with a narrow width and a deep depth so as to have a ratio of the width Wb and the depth Db of 3.4:1 to 1.5:1.

The groove formation step may form the groove by using a continuous wave laser that may use a $TEM_{00}$ mode having a Gaussian energy distribution, and may have $M^2$ of 1.0-1.1 as a beam quality factor.

The continuous wave laser may have a wavelength of a 1.06-1.08 μm range, an output of 0.5-5 kW, and an energy density of 0.5-2.0 $J/mm^2$.

The continuous wave laser may be a Nd:YAG laser or a fiber laser.

The laser may have the energy density of a range of Equation 1 below.

$$0.010 \text{ W}^{-1} \text{ m/s} \leq P^{-1} \times V \leq 0.080 \text{ W}^{-1} \text{ m/s} \quad 1$$

(Here, P is an output (W) of the laser, and V is a laser irradiation speed (m/s).)

In the step of forming the groove, the groove may be formed so as to have a ratio of the width Wb and the depth Db of 3.2:1 to 2:1.

In the step of forming the groove, the groove may be formed so that an inflection point Xb of a tangential portion interconnecting vertical tangential portions of a curvature radius RBb of a position where a depth of the groove bottom is a maximum and a curvature radius RSb on the groove surface from a position where the groove depth is a maximum to a quarter-way position of the groove depth Db may be formed below the halfway position (½ Da) of the groove depth.

In the step of forming the groove, the groove may be formed to have the curvature radius RBb of 0.2 μm to 100 μm at the position where the depth of the groove is a maximum.

The non-metal oxide layer may be formed of any one among $Mg_2SiO_4$, $MgAl_2O_4$, $MnO$, $MnO_2$, and $Mn_2SiO_4$ or a combination of more than one thereof.

The non-metal oxide layer may be formed with a 1-20 μm thickness. The non-metal oxide layer may be formed with a 1-5 μm thickness.

An insulating coating layer may be further formed on the non-metal oxide layer.

Recrystallization of a coated steel plate may be further formed under the groove by heat-treating the electrical steel plate formed with the groove.

The method of forming the recrystallization may be one of heat treatment or stress relaxation annealing for forming an insulating coating layer.

The depth Db of the groove in the step of forming the groove may be 3% to 8% of an electrical steel plate thickness.

An upper width Wb of the groove formed in the step of forming the groove may be 10 μm to 50 μm.

An angle formed by a linear groove in the step of forming the groove and a rolling direction of the electrical steel plate may be 82° to 98° (excluding) 90°.

In the step of forming the groove, the laser beam of 10 μm to 30 μm in a width direction of the steel plate and 5 μm to 20 μm in a rolling direction of the steel plate may be irradiated to the steel plate to firstly form the groove, and then the laser beam of 35 μm to 80 μm in the width direction of the steel plate and 25 μm to 50 μm in the rolling direction of the steel plate may be irradiated on the first groove to further form a secondary groove.

According to the manufacturing method of the grain-oriented electrical steel plate according to an exemplary embodiment of the present invention, the groove with the relatively narrow width and deep depth may be formed on the surface of the steel plate while proceeding at a high speed.

In addition, according to the manufacturing method of the grain-oriented electrical steel plate according to an exemplary embodiment of the present invention, the magnetic domain miniaturizing by the laser irradiation may be performed with the relatively low energy density by the non-metal oxide layer formed on the surface of the steel plate after the secondary recrystallization.

Further, according to the manufacturing method of the grain-oriented electrical steel plate according to an exemplary embodiment of the present invention, the groove having the narrow width and the deep depth may be formed by the laser irradiation and the iron loss improvement characteristic of more than 3% may be obtained even after the laser irradiation.

Still further, according to the manufacturing method of the grain-oriented electrical steel plate according to an exemplary embodiment of the present invention, the groove may be formed on the surface of the electrical steel plate by irradiating the laser at a high speed.

MODE FOR INVENTION

The advantages and features of the present invention and the methods for accomplishing the same will be apparent from the exemplary embodiments described hereinafter with reference to the accompanying drawings. However, the present invention is not limited to the exemplary embodiments described hereinafter, but may be embodied in many different forms. The following exemplary embodiments are provided to make the disclosure of the present invention complete and to allow those skilled in the art to clearly understand the scope of the present invention, and the present invention is defined only by the scope of the appended claims. Throughout the specification, the same reference numerals denote the same elements.

In some exemplary embodiments, detailed description of well-known technologies will be omitted to prevent the disclosure of the present invention from being interpreted ambiguously. Unless otherwise defined, all terms (including technical and scientific terms) used herein have the same meaning as commonly understood by one of ordinary skill in the art. In addition, 1.0 throughout the specification, unless explicitly described to the contrary, the word "comprise" and variations such as "comprises" or "comprising" will be understood to imply the inclusion of stated elements but not the exclusion of any other elements. Further, as used herein, the singular forms "a", "an", and "the" are intended to include the plural forms as well, unless the context clearly indicates otherwise.

An exemplary embodiment of the present invention is the permanent magnetic domain miniaturizing technique of irradiating the laser to a non-metal oxide layer having a laser absorption rate or the steel plate surface insulating-coated on the non-metal oxide layer to form the groove with the comparatively low energy density and irradiating the laser at a high speed while having the iron loss improvement characteristic even after the laser irradiation when forming the groove in the surface of the steel plate with a depth within 3%-8% of a steel plate thickness by using the laser.

In the case of forming the groove on the surface of the steel plate in this way, a fusion alloy layer is not formed in a side part or a lower part and the partial fusion alloy layer may remain in the surface of the steel plate at right and left sides of an upper part.

As described above, as the fusion alloy layer is not formed at the lower part and the side part by irradiating the laser to the steel plate surface formed with the non-metal oxide layer, a condition to maintain a characteristic that the iron loss after and before a heat treatment in a length direction and a width direction of the steel plate is improved is as follows.

Firstly, the non-metal oxide layer must be formed on the surface of the steel plate. This non-metal oxide layer is formed on the surface of the steel plate after secondary recrystallization is completed by coating and then annealing an annealing separator at a high temperature among the manufacturing process of the grain-oriented electrical steel plate.

The non-metal oxide layer formed on the surface of the steel plate after the high temperature annealing may be formed of any one among $Mg_2SiO_4$, $MgAl_2O_4$, MnO, $MnO_2$, and $Mn_2SiO_4$, or one more composites thereof.

As described above, if the non-metal oxide layer is formed on the surface of the steel plate, the laser absorption rate during the laser irradiation increases by 30% or more compared to a steel plate without the non-metal oxide layer such that the groove may be formed even with a relatively low energy density, thereby forming the linear groove with a high irradiation speed.

Accordingly, the steel plate formed with the non-metal oxide layer has high efficiency in improving the iron loss as a laser output required for the groove formation decreases by 20% or more compared with the steel plate without the non-metal oxide layer.

When the non-metal oxide layer is formed on the surface of the steel plate, the non-metal oxide layer physically and chemically has a strong bond to the surface of the steel plate surface such that the surface is not easily damaged against a heat impact due to the laser irradiation.

It is preferable that the non-metal oxide layer having the high laser absorption rate is formed with a thickness of 1-20 μm on the surface of the steel plate. When the thickness of the non-metal oxide layer is less than 1 μm, the increasing effect of the laser absorption rate is low, and the non-metal oxide layer may be damaged by the heat impact during the laser irradiation, while when the thickness is more than 20 μm, it is difficult to control the process conditions to form the non-metal oxide layer and there is a drawback that the laser output for the groove formation increases. More preferably, the thickness of the non-metal oxide layer formed at the surface of the steel plate is 1-5 μm.

Next, a characteristic irradiated to the surface of the steel plate formed with the non-metal oxide layer must be optimized.

In the characteristic of a laser irradiated to the surface of the steel plate formed with the non-metal oxide layer, an energy distribution of the final laser beam must be a Gaussian energy distribution. If the energy distribution is the Gaussian energy distribution, the energy distribution is relatively unrelated to an oscillation method of the laser or the shape of the final beam, however a continuous wave laser or an extended pulse laser is preferable.

Also, it is preferable that the mode of the laser having the Gaussian energy distribution is a $TEM_{00}$ mode having a maximum intensity in an optical axis center of a single mode. It is preferable that $M^2$ as a beam quality factor representing a mode of the laser beam is 1.0-1.1. That is, it is preferable that the laser beam having the Gaussian energy distribution is a laser beam of which $M^2$ of the $TEM_{00}$ mode is 1.0-1.1.

If is preferable that the laser used in the magnetic domain miniaturizing is the laser of which a wavelength is a 1.06-1.08 μm range. Accordingly, any laser of this wavelength range can be used, and it is more preferable than a Nd:YAG laser or a fiber laser is used.

In this case, the output of the used laser is preferably 0.5-5 kW, and the energy density of the laser is preferably 0.5-2.0 $J/mm^2$. The appropriate groove for the iron improvement is not formed below the lower limit or above the upper limit of the laser output and the energy density.

Also, the final shape of the laser beam irradiated to the steel plate is preferably an oval shape, a rolling direction width of the oval beam is preferably 0.005-0.1 mm, and a length of the beam of the steel plate width direction is preferably 0.01-0.2 mm.

Also, the energy density at which the irradiated laser beam enters the steel plate may be represented by a laser average output P (W=j/s), and the irradiation speed (a scan speed: V=m/s) and a range of Equation 1 below is preferable.

$$0.010 \ W^{-1} \ m/s \leq P^{-1} \times V \leq 0.080 \ W^{-1} \ m/s \quad\quad 1$$

(Herein, P is an output W of the laser, and V is a laser irradiation speed (m/s).)

The reason for limiting the energy density of the laser like Equation 1 is that the iron loss characteristic is deteriorated as the heat effect increases to the groove when forming the groove by the laser in the case of less than $0.010 \ W^{1} \ m/s$, and there is a problem that the groove of the surface is not formed with a depth of a degree such that the iron loss is improved after the heat treatment in the case of more than $0.080 \ W^{-1} \ m/s$.

Figure 1:
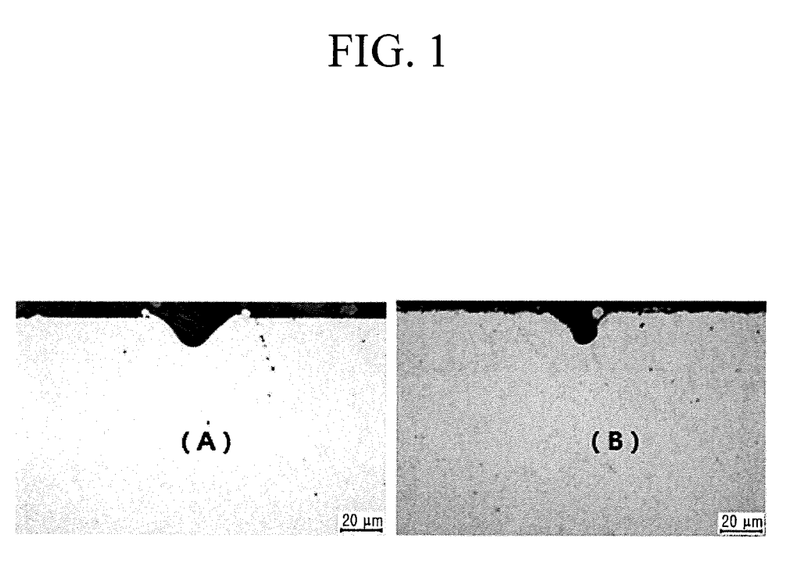
FIG. 1 is a photo showing a cross-section of a groove formed in a grain-oriented electrical steel plate according to an exemplary embodiment of the present invention.

When the laser having the above-described characteristic is irradiated to the surface of the steel plate formed with the non-metal oxide layer as described above at a high speed, the groove of the shape as in FIG. 1 is formed on the surface of the steel plate.

Figure 2:
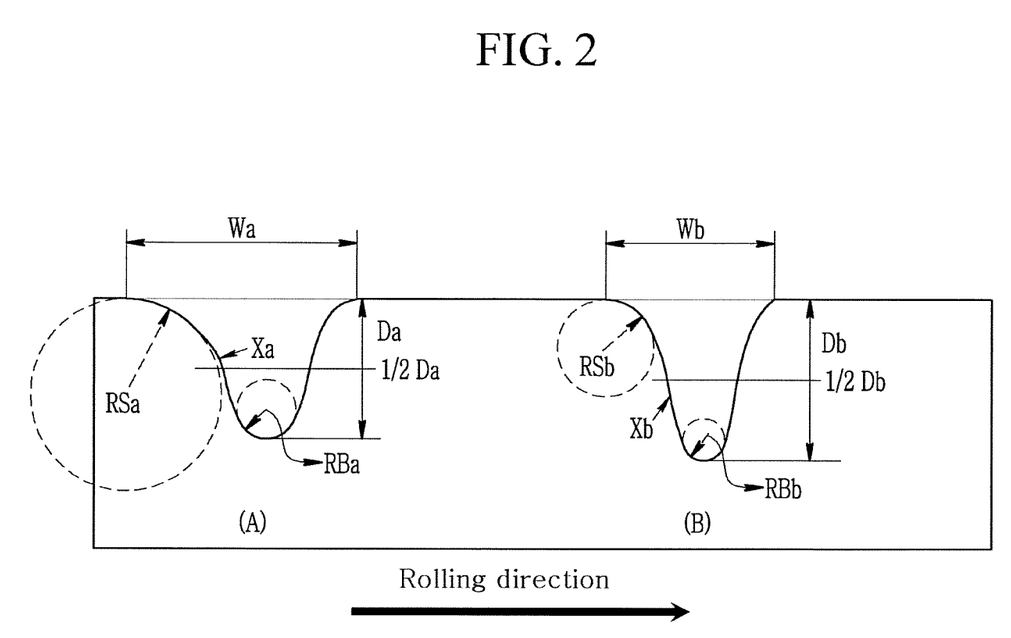
FIG. 2 is a schematic view showing a cross-section of a groove formed in a grain-oriented electrical steel plate according to an exemplary embodiment of the present invention.

FIG. 1 is a photo showing a cross-section of a groove formed in a grain-oriented electrical steel plate according to an exemplary embodiment of the present invention, and FIG. 2 is a schematic view showing a cross-section of a groove formed in a grain-oriented electrical steel plate according to an exemplary embodiment of the present invention.

In FIG. 1 and FIG. 2, A is a cross-sectional photo and a schematic view of the steel plate irradiated by the laser with the conditions below in a state that only mineral series are coated to the electrical steel plate of the thickness 0.23 mm until a cold rolling process is completed in the manufacturing process of the grain-oriented electrical steel plate, respectively, while B is a cross-sectional photo and a schematic view of the steel plate in the case that the laser is irradiated to the electrical steel plate with the conditions below in a state that a cold-rolled steel plate is manufactured with the same condition as A, respectively, and then the annealing separator including MgO as a main component is coated, a secondary recrystallization annealing is performed, and then a process of applying an insulating coating solution containing a colloidal silica and a metal phosphate is further performed.

In the laser irradiation condition of FIG. 1, the continuous wave fiber laser of the 1.07 μm wavelength is used, and in this case, the beam of the fiber laser irradiated to the steel plate is a $TEM_{00}$ mode and is controlled to have a characteristic of the oval beam of the Gaussian shape of which the $M^2$ value is 1.07. Here, the size of the oval beam is 15 μm in the rolling direction and 40 μm in the width direction of the steel plate, the laser output is 0.9 kW, the energy density of the laser is 1.13 $J/mm^2$, and a laser irradiation interval is 2.5 mm.

The electrical steel plate used in FIG. 1 includes O: 0.0050%, Si: 3.1%, C: 0.05%, Al: 0.03%, Mn: 0.07%, N: 0.003%, S: 0.005%, and P: 0.02% as wt %, and Fe and other unavoidable contamination impurities as a balance are included.

In FIG. 1, the groove is formed in the surface of the steel plate by the same laser irradiation condition, and while the groove formed on the steel plate A after the cold rolling has a width of 45 μm and a depth of 12.9 μm, the groove formed on the steel plate B including $Mg_2SiO_4$ as the non-metal oxide layer has a width of 30 μm and a depth of 18.2 μm. Here, the width of the groove means the width (Wa and Wb) of the groove entrance formed on the steel plate in a view of the cross-section of the steel plate, as shown in FIG. 2, that is, a maximum groove width in the steel plate surface.

As described above, even if the groove is formed by the same laser irradiation conditions, the groove formed on the steel plate A after the cold rolling has the larger width than that of the steel plate B including the non-metal oxide layer, and in contrast, the depth of the groove formed on the steel plate A after the cold rolling is not deeper than the steel plate B including the non-metal oxide layer. This results because the non-metal oxide layer formed on the steel plate surface better absorbs the energy of the laser (the laser energy absorption rate in the case of the cold-rolled steel plate is about 20% and the laser energy absorption rate in the case of the steel plate including the non-metal oxide layer is approximately 40%) in the case of the steel plate B including the non-metal oxide layer such that the groove having the narrower width and the deeper depth is formed by the laser irradiation in the case of the steel plate B including the non-metal oxide layer.

This result can be expressed as follows. That is, when the width of the groove formed on the steel plate A after the cold rolling is referred to as Wa and the depth is referred to as Da, and the width of the groove of the steel plate B formed with the non-metal oxide layer is referred to as Wb and the depth is referred to as Db, a relationship equation therebetween may be represented by Equation 2 below.

$$Wa > Wb \text{ and } Da < Db \quad\quad 2$$

In addition, as an experiment result under the same conditions for 0.3 mm, 0.27 mm, and 0.23 mm as the thickness of the electrical steel plate, it is confirmed that a ratio of the width Wa and the depth Da of the groove formed on the steel plate A after the cold rolling is 5:1, and a maximum ratio is about 3.5:1 even if the depth is deeper by changing the laser irradiation conditions.

However, as an experiment result for the steel plate B including the non-metal oxide layer having the thicknesses of the same electrical steel plate, the groove of the steel plate is formed to have the relatively narrower width and deeper depth as the ratio of the width Wb and the depth Db of the groove is 3.4:1 to 1.5:1.

Therefore, it is preferable that the ratio of the width Wb and the depth Db of the groove of the steel plate B including the non-metal oxide layer is 3.4:1 to 1.5:1, and more preferably, 3.2:1 to 2:1. When forming the groove on the steel plate including the non-metal oxide layer, the groove may be formed by the relatively low energy density, and as the ratio of the width and the depth of the groove appears as 3.4:1 to 1.5:1, the improvement characteristic of the iron loss is high even after the laser irradiation and the laser may be irradiated at the high speed to form the groove on the surface of the electrical steel plate.

Also, as a result of forming the groove on the surface of the steel plate in the same laser irradiation condition, there is a shape difference between the groove formed on the steel plate A after the result of cold rolling and the groove formed on the steel plate B including the non-metal oxide layer.

That is, for the groove formed on the steel plate A after the result of cold rolling and the groove formed on the steel plate B including the non-metal oxide layer, a bottom and a surface part of the groove are formed to be rounded. It is considered that the bottom and the surface part of the groove formed on the steel plate are rounded because of heat distribution formed according to the characteristic of the beam shape when using the laser beam of the Gaussian shape.

In this case, when a curvature radius of the rounded part at a position where the depth of the groove bottom is a maximum is referred to as $RB_{Bottom}$ and the curvature radius in the groove surface from a position where the groove depth is a maximum to the quarter-way position of the groove depth D is referred to as $RS_{surface}$, the bottom curvature radius of the groove formed on the steel plate A after the cold rolling is called RBa, the curvature radius of the surface part is called RSa, and two curvature radiuses for the groove formed on the steel plate B including the non-metal oxide layer are called RBb and RSb. Also, when vertical tangential portions of the two curvature radiuses are interconnected, inflection points Xa and Xb are formed at a position where these tangential portions meet. These inflection points Xa and Xb are formed at a halfway position of a line segment connecting two vertical tangential portions.

As shown in FIG. 2, while the inflection point Xa of the groove formed on the steel plate A after the cold rolling is formed above the halfway position (½ Da) of the formed groove depth, the inflection point Xb of the groove formed on the steel plate B including the non-metal oxide layer is formed under the halfway position (½ Da) of the formed groove depth.

Accordingly, in the magnetic domain miniaturizing process of the electrical steel plate, it is preferable to control the process conditions so as to form the inflection point Xb under the halfway position (½ Da) of the groove depth on the formed groove when miniaturizing the magnetic domain by the laser for the electrical steel plate after the secondary recrystallization is completed.

Figure 3:
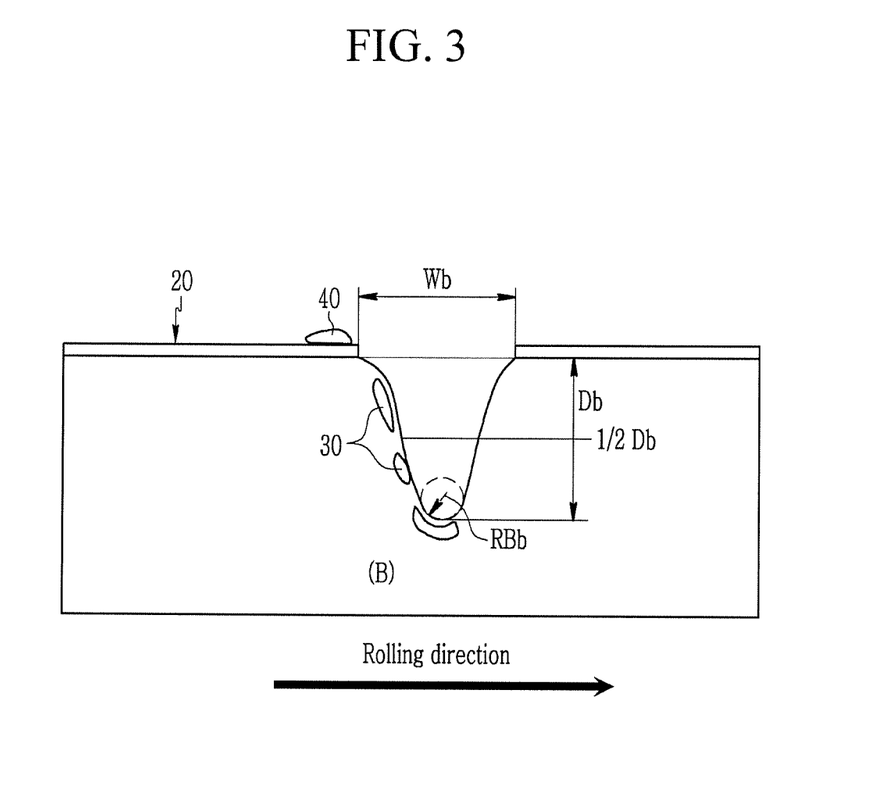
FIG. 3 is a view showing a cross-section of a groove formed in a grain-oriented electrical steel plate according to an exemplary embodiment of the present invention.

FIG. 3 is a view showing a cross-section of a groove formed in a grain-oriented electrical steel plate according to an exemplary embodiment of the present invention.

Referring to FIG. 3, in the grain-oriented electrical steel plate according to an embodiment of the present invention, the non-metal oxide layer 20 such as $Mg_2SiO_4$ is formed on the surface of the steel plate B, and the groove is formed on the surface of the steel plate by the magnetic domain miniaturizing process. The insulating coating layer may be selectively formed on the non-metal oxide layer 20.

The groove formed on the steel plate and having the narrower width and the deeper depth may have the curvature radius RBb of 0.2 µm to 100 µm at the position where the depth of the groove is a maximum. In more detail, the curvature radius RBb may be 0.2 µm to 50 µm.

When the curvature radius RBb is less than 0.2 µm at the position (a lower vertex of Db) where the depth of the groove is a maximum, a melt material of the coated steel plate remains inside the groove such that it is difficult to obtain an electrical insulation characteristic after the insulating coating, and in a case of more than 100 µm, the iron loss improvement rate may be deteriorated.

Further, the curvature radius RSb of 4 µm to 130 µm on the groove surface is included from the position where the groove depth is a maximum to the quarter-way position of the groove depth Db. Here, the depth Db of the groove means a distance between a part where the groove of the steel plate surface is not formed to the position where the groove depth is a maximum.

Also, when the curvature radius RSb is less than 4 µm on the groove surface from the position where the groove depth is a maximum to the quarter-way position of the groove depth Db, the melt of the coated steel plate remains inside the groove such that it is difficult to obtain the electrical insulation characteristic from the insulating coating, while in the case of more than 130 µm, the iron loss improvement rate may be deteriorated. However, as indicated by reference numeral 40 of FIG. 3, the melt formed by the laser irradiation may be solidified on an outside surface of the upper part of the groove to remain.

The depth Db of the groove may be 3% to 8% of the thickness of the electrical steel plate. More preferably, it may be 4% to 8%. In the case of less than 3%, the groove of the appropriate depth for the iron loss improvement may not be formed, while in the case of more than 8%, the heat-affected part increases such that a growth of a goss texture may be adversely affected.

Also, the upper width Wb of the groove may be 10 µm to 50 µm. In the case of less than 10 µm, the appropriate width for the iron loss improvement may not be maintained, while in the case of more than 50 µm, the heat-affected part increases such that the magnetism may be deteriorated.

Also, referring to FIG. 3, recrystallization 30 of the coated steel plate may be formed due to the heat under the groove. As described above, if the recrystallization 30 is formed after the heat treatment for the electrical steel plate, the iron loss improvement characteristic appears due to the magnetic domain having the narrower width. The recrystallization 30 may be non-continuously formed under the groove, or may be continuously formed.

As the method of forming the recrystallization 30 under the groove, the groove is formed by the laser irradiation and then the steel plate may be heat-treated. As the heat treatment method, there is a method of performing heat treatment after the insulating coating or performing stress relaxation annealing.

Also, the groove may be formed at 82° to 98° with respect to a rolling direction of the electrical steel plate. The groove is formed of a shaded pattern that does not include 90°, so the magnetism may be improved by deteriorating a semi-magnetic field.

Next, a manufacturing method of the grain-oriented electrical steel plate according to an exemplary embodiment of the present invention for manufacturing the above-described grain-oriented electrical steel plate will be described.

The manufacturing method of the grain-oriented electrical steel plate according to an exemplary embodiment of the present invention includes a step of irradiating the laser to the surface of the steel plate to form the groove on the surface of the steel plate after the non-metal oxide layer is formed on the surface of the steel plate by the secondary recrystallization annealing.

In general, the manufacturing process of the grain-oriented electrical steel plate is performed in order of hot rolling and hot rolled plate annealing, cold rolling, decarburization annealing (first recrystallization annealing), high temperature annealing (secondary recrystallization annealing), planarization annealing, and insulating coating for a slab including Si at 3 wt %.

The magnetic domain miniaturizing process by the laser irradiation may be performed after the cold rolling or the secondary recrystallization annealing, however the manufacturing method of the grain-oriented electrical steel plate according to an exemplary embodiment of the present invention may irradiate the laser to the surface of the steel plate for the magnetic domain miniaturizing after coating the annealing separator on the surface of the steel plate after the decarburization annealing (the first recrystallization annealing) and then performing the high temperature annealing (the secondary recrystallization annealing) to form the non-metal oxide layer on the surface of the steel plate.

As the method of forming the non-metal oxide layer on the surface of the steel plate, it is preferable that the cold rolling steel plate is manufactured by the manufacturing process of the electrical steel plate, then the decarburization annealing is applied, the annealing separator made of MgO as the main element and other additives is coated on the steel plate, and then the high temperature annealing is applied to form the non-metal oxide layer including the non-metal oxide along such as $Mg_2SiO_4$ (forsterite), $MgAl_2O_4$ (spinel), MnO, $MnO_2$, $Mn_2SiO_4$, or a combination thereof.

As described above, the magnetic domain miniaturizing may be performed by irradiating the laser directly after forming the non-metal oxide on the surface of the steel plate, or the magnetic domain miniaturizing may be performed by irradiating the laser after additionally forming the insulating film on the surface of the steel plate by coating and heat-treating the insulating coating liquid including the colloidal silica and the metal phosphate on the non-metal oxide layer.

As described above, when the non-metal oxide layer is formed on the surface of the steel plate, the laser absorption rate increases such that the groove may be formed by the relatively low energy density.

As described above, when the magnetic domain is miniaturized by irradiating the laser to the surface of the steel plate formed with the non-metal oxide layer, the irradiation conditions of the laser may satisfy Equation 1.

In this case, as long as the laser beam has the Gaussian energy distribution, the oscillation method of the laser is independent, however the continuous wave laser or the extended pulse laser is preferable.

It is preferable that the mode of the laser having the Gaussian energy distribution is the $TEM_{00}$ mode having the maximum intensity on an optical axis center of the single mode. Also, it is preferable that the $M^2$ as the beam quality factor representing the mode of the laser beam is 1.0-1.1.

It is preferable that the laser used to the magnetic domain miniaturizing has the 1.06-1.08 µm wavelength range. Any laser in this wavelength range is possible, and it is more preferable to use a Nd:YAG laser or fiber laser.

In this case, it is preferable that the output of the used laser is 0.5-5 kW, and the energy density of the laser is 0.5-2.0 $J/mm^2$.

Further, the final shape of the laser beam irradiated to the steel plate is preferably the oval shape, the rolling direction width of the oval beam is preferably 0.005-0.1 mm, and the length of the beam of the steel plate width direction is preferably 0.03-0.2 mm.

The groove having the 3% to 8% depth with respect to the electrical steel plate thickness may be formed by irradiating the laser to satisfy the condition.

In one exemplary embodiment, after irradiating the laser to form the groove, a laser beam having a different width and length may be irradiated to the groove such that the curvature radius RBb at the position where the depth of the groove is a maximum is 0.2 µm to 100 µm and the curvature radius RSb on the groove surface from the position where the groove depth is a maximum to the quarter-way position of the depth D of the groove is 4 µm to 130 µm.

In another exemplary embodiment, the laser beam of 10 µm to 30 µm in the width direction of the steel plate and 5 µm to 20 µm in the rolling direction of the steel plate may be irradiated to the steel plate to form a first groove, and then the laser beam of 35 µm to 80 µm in the width direction of the steel plate and 25 µm to 50 µm in the rolling direction of the steel plate is irradiated on the first groove to form the secondary groove. Accordingly, the groove may be formed so that the curvature radius RBb at the position where the depth of the groove is a maximum is 0.2 µm to 100 µm and the curvature radius RSb on the groove surface from the position where the groove depth is a maximum to the quarter-way position of the depth D of the groove is 4 µm to 130 µm.

However, the method that forms the groove in the exemplary embodiment is only an example, and when the groove has the shape such that the curvature radius RBb at the position where the depth of the groove is a maximum is 0.2 µm to 100 µm and the curvature radius RSb on the groove surface from the position where the groove depth is a maximum to the quarter-way position of the depth D of the groove is 4 µm to 130 µm, because the purpose of the present invention may be achieved, the method of forming the groove is not particularly limited.

Therefore, in another exemplary embodiment, it is preferable that the method of forming the groove is the method of the laser irradiation, however mechanical polishing or chemical etching for forming the groove may be included.

Next, an exemplary embodiment will be described in detail. However, the following exemplary embodiment is merely an example of the present invention, and the content of the present invention is not limited by the following exemplary embodiment.

First, the slab including O: 0.0050 wt %, Si: 3.0 wt %, C: 0.05 wt %, Al: 0.03 wt %, Mn: 0.07 wt %, N: 0.003 wt %, S: 0.005 wt %, and P: 0.02 wt %, and the balance including Fe and other inevitable impurities is prepared.

The slab is heated to 1100° C. and then is hot-rolled to manufacture the hot rolled steel plate. Next, the hot rolled steel plate is cold-rolled to manufacture the cold-rolled steel plate of the 0.3 mm thickness.

The manufactured cold-rolled steel plate is also applied with the decarburization annealing and the nitride treatment, and then the annealing separator including MgO as the main component is coated at 8 $g/m^2$ and then the secondary recrystallization annealing is applied to the steel plate.

A $Mg_2SiO_4$ (forsterite) coating layer of about a 3-5 µm thickness is formed on the surface of the steel plate by the secondary recrystallization annealing.

Next, the continuous wave fiber laser of the Gaussian beam shape is irradiated to the electrical steel plate with the 0.30 mm thickness formed with the $Mg_2SiO_4$ (forsterite) coating layer for the magnetic domain miniaturizing process.

In this case, the output of the fiber laser is 900 W, and the irradiation speed is controlled to satisfy a V/P value as in Table 1 below. Further, when forming the groove by the laser irradiation, the curvature radius RBb at the position Db where the depth of the groove is a maximum and the curvature radius RSb on the groove surface from the position where the groove depth is a maximum to the quarter-way position of the depth D of the groove are formed to have values of Table 1. In this case, the linear groove is formed to have an 85° angle with respect to the rolling direction of the electrical steel plate.

TABLE 1

| Recrystallization existence under groove | Curvature radius RBb | Curvature radius RSb | V/P W$^{-1}$m/s | Before laser treatment W$_{17/50}$ | After laser treatment W$_{17/50}$ | After coating insulation W$_{17/50}$ | Iron loss improvement rate % | Division |
|---|---|---|---|---|---|---|---|---|
| O | 0.1 | 4.0 | 0.02 | 0.92 | 0.90 | 0.90 | 2.2 | Comparative Example 1 |
|   | 0.2 | 4.0 | 0.03 | 0.92 | 0.81 | 0.80 | 12.0 | Invention Example 1 |
|   | 2.0 | 20.0 | 0.02 | 0.93 | 0.83 | 0.82 | 10.8 | Invention Example 2 |
|   | 2.0 | 40.0 | 0.02 | 0.92 | 0.83 | 0.82 | 9.8 | Invention example 3 |
|   | 2.0 | 100.0 | 0.02 | 0.93 | 0.84 | 0.83 | 9.2 | Invention example 4 |
|   | 50.0 | 120.0 | 0.04 | 0.93 | 0.83 | 0.83 | 10.8 | Invention Example 5 |
|   | 50.0 | 130 | 0.05 | 0.93 | 0.90 | 0.90 | 3.2 | Invention Example 6 |
|   | 50.0 | 120.0 | 0.05 | 0.93 | 0.85 | 0.83 | 8.6 | Invention Example 7 |
| X | 2.0 | 20.0 | 0.02 | 0.93 | 0.98 | 0.87 | −5.4 | Comparative Example 2 |

In Table 1, the iron loss improvement rate is calculated with $(W_1-W_2)/W_1$ by measuring an iron loss $W_1$ of the electrical steel plate before forming the groove through the laser irradiation and an iron loss $W_2$ after forming the groove through the laser irradiation.

As shown in Table 1, it is confirmed that the iron loss improvement rate appears at 3% or more in all the invention examples satisfying the laser irradiation condition of the present invention and the groove formation condition, however the iron loss improvement rate appears below 3% in both the comparative examples not satisfying the laser irradiation condition of the present invention and the groove formation condition.

Also, as shown in Table 1, it may be confirmed that the iron loss improvement rate is good when forming the recrystallization under the groove by the heat treatment, however the iron loss improvement rate is lower or worse when omitting the recrystallization under the groove.

While the exemplary embodiments have been described hereinbefore with reference to the accompanying drawings, it will be understood by those skilled in the art that various changes in form and details may be made thereto without departing from the technical spirit and essential features of the present invention.

Therefore, it is to be understood that the above-described exemplary embodiments are for illustrative purposes only and the scope of the present invention is not limited thereto. It is to be understood that the scope of the present invention is defined not by the detailed description but by the following claims, and all changes and variants derived from the meaning and scope of the claims and equivalents thereof are also included in the scope of the present invention.

The invention claimed is:

1. A grain-oriented electrical steel plate having a surface formed with a groove, wherein the groove is formed in a state that a non-metal oxide layer is coated on the surface of the electrical steel plate, and
   the groove is formed with a narrow width and a deep depth as a ratio of the width Wb to the depth Db is 3.4:1 to 1.5:1,
   wherein the groove has a curvature radius RBb of 0.2 μm to 100 μm at a position where the depth of the groove is a maximum, and
   wherein a curvature radius Rs on the groove surface from the position where the groove depth is a maximum to the quarter-way position of the depth D of the groove is 4 μm to 130 μm.

2. The grain-oriented electrical steel plate of claim 1, wherein the groove is formed with the narrow width and the deep depth with a ratio of the width Wb to the depth Db being 3.2:1 to 2:1.

3. The grain-oriented electrical steel plate of claim 1, wherein
   an inflection point Xb of a tangential portion interconnecting vertical tangential portions of a curvature radius RBb of a position where a depth of the groove bottom is a maximum and a curvature radius RSb on the groove surface from a position where the groove depth is a maximum to a quarter-way position of the groove depth Db is formed below a halfway position (½ Da) of the groove depth.

4. The grain-oriented electrical steel plate of claim 1, wherein the non-metal oxide layer is formed of any one among $Mg_2SiO_4$, $MgAl_2O_4$, $MnO$, $MnO_2$, and $Mn_2SiO_4$, or a combination more than one thereof.

5. The grain-oriented electrical steel plate of claim 4, wherein the non-metal oxide layer is formed with a 1-20 μm thickness on the surface of the electrical steel plate.

6. The grain-oriented electrical steel plate of claim 4, wherein recrystallization of a coated steel plate exists under the groove.

7. The grain-oriented electrical steel plate of claim 6, wherein
   a depth Db of the groove is 3% to 8% of the thickness of the electrical steel plate.

8. The grain-oriented electrical steel plate of claim 7, wherein an upper width Wb of the groove is 10 μm to 50 μm.

9. The grain-oriented electrical steel plate of claim 8, wherein
   the groove is formed to be linear, and the linear groove form an angle of 82° to 98° (excluding 90°) with respect to a rolling direction of the electrical steel plate.

10. A method for manufacturing a grain-oriented electrical steel plate, comprising:
    a step of coating an annealing separator on a cold-rolled electrical steel plate after decarburization annealing and forming secondary recrystallization through high temperature annealing to form a non-metal oxide layer on a surface of the electrical steel plate; and a step of forming a groove on a surface of the electrical steel plate formed with the non-metal oxide layer, wherein the groove is formed with a narrow width and a deep depth so as to have a ratio of the width Wb and the depth Db of 3.4:1 to 1.5:1, and wherein the groove has a curvature radius RBb of 0.2 μm to 100 μm at a position where the depth of the groove is a maximum, and wherein a curvature radius Rs on the groove surface from the position where the groove depth is a maximum to the quarter-way position of the depth D of the groove is 4 μm to 130 μm.

11. The method of claim 10, wherein the groove formation step forms the groove by using a continuous wave laser that uses a $TEM_{00}$ mode having a Gaussian energy distribution, and has $M^2$ of 1.0-1.1 as abeam quality factor.

12. The method of claim 11, wherein the continuous wave laser has a wavelength of a 1.06-1.08 μm range, an output of 0.5-5 kW, and an energy density of 0.5-2.0 $J/mm^2$.

13. The method of claim 12, wherein the continuous wave laser is a Nd:YAG laser or a fiber laser.

14. The method of claim 11, wherein the laser has energy density of a range of Equation 1 below:

$$0.010 \text{ W}^{-1} \text{ m/s} \leq P^{-1} \times V \leq 0.080 \text{ W}^{-1} \text{ m/s} \qquad 1$$

(wherein P is an output (W) of the laser, and V is a laser irradiation speed (m/s)).

15. The method of claim 14, wherein the non-metal oxide layer is formed of any one among $Mg_2SiO_4$, $MgAl_2O_4$, MnO, $MnO_2$, and $Mn_2SiO_4$, or a combination of more than one thereof.

16. The method of claim 15, wherein an insulating coating layer is further formed on the non-metal oxide layer.

17. The method of claim 16, wherein recrystallization of a coated steel plate is further formed under the groove by heat-treating the electrical steel plate formed with the groove.

18. The method of claim 10, wherein in the step of forming the groove, a laser beam of 10 μm to 30 μm in a width direction of the steel plate and 5 μm to 20 μm in a rolling direction of the steel plate is irradiated to the steel plate to firstly form the groove, and then a laser beam of 35 μm to 80 μm in the width direction of the steel plate and 25 μm to 50 μm in the rolling direction of the steel plate is irradiated on the first groove to further form a secondary groove.

19. A grain-oriented electrical steel plate having a surface formed with a groove, wherein the groove is formed by using a continuous wave laser and in a state that a non-metal oxide layer is coated on the surface of the electrical steel plate, and the groove is formed with a narrow width and a deep depth as a ratio of the width Wb to the depth Db is 3.4:1 to 1.5:1, wherein the groove has a curvature radius RBb of 0.2 μm to 100 μm at a position where the depth of the groove is a maximum, and wherein a curvature radius Rs on the groove surface from the position where the groove depth is a maximum to the quarter-way position of the depth D of the groove is 4 μm to 130 μm.

* * * * *